US00RE50688E

(19) United States
(12) Reissued Patent
Cao

(10) Patent Number: US RE50,688 E
(45) Date of Reissued Patent: Dec. 9, 2025

(54) MULTIFUNCTIONAL FOLDING TROLLEY

(71) Applicant: SUZHOU XINDADI HARDWARE CO., LTD., Suzhou (CN)

(72) Inventor: Zhixiang Cao, Suzhou (CN)

(73) Assignee: SUZHOU XINDADI HARDWARE CO., LTD., Suzhou (CN)

(21) Appl. No.: 18/210,354

(22) Filed: Jun. 15, 2023

Related U.S. Patent Documents

Reissue of:

(64) Patent No.: 11,034,370
Issued: Jun. 15, 2021
Appl. No.: 16/614,557
PCT Filed: Sep. 27, 2018
PCT No.: PCT/CN2018/107793
§ 371 (c)(1),
(2) Date: Nov. 18, 2019
PCT Pub. No.: WO2019/024945
PCT Pub. Date: Feb. 7, 2019

(30) Foreign Application Priority Data

Jul. 31, 2017 (CN) ..... 201710644469.2

(51) Int. Cl.
*B62B 3/02* (2006.01)
*B62B 3/04* (2006.01)

(52) U.S. Cl.
CPC ..... *B62B 3/022* (2013.01); *B62B 3/04* (2013.01)

(58) Field of Classification Search
None
See application file for complete search history.

(56) References Cited

U.S. PATENT DOCUMENTS 3,698,733 A * 10/1972 Isaacs ..... B62B 3/002 280/33.998
7,114,733 B2 10/2006 Downs
(Continued)

FOREIGN PATENT DOCUMENTS

CN 103040243 A 4/2013
CN 105235724 A 1/2016
(Continued)

*Primary Examiner* — Sarah B Mcpartlin

(57) ABSTRACT

The present invention discloses a multifunctional folding trolley, which comprises four pillars, a first tray at the upper end of the four pillars, a second tray at the middle of the four pillars, and a third tray at the lower end of the four pillars, the third tray being provided at the bottom with roller feet; the four pillars, arranged in a cubic shape with side openings, comprise a first pillar group and a second pillar group arranged front and rear in the direction of motion; with one end of the first tray in the length direction detachably disposed on the second pillar group, the first tray is provided at the other end in the length direction with a folding point associated with the first pillar group, such that it can be attached to the first pillar group; with one end of the second tray in the length direction detachably disposed on the first pillar group, the second tray is provided at the other end in the length direction with a folding point associated with the second pillar group, such that it can be attached to the second pillar group; the first pillar group, having a folding point associated with the third tray, can be attached to the third tray; the second pillar group, having a folding point associated with the third tray, can be attached to the first tray. The multifunctional folding trolley provided by the present
(Continued)

invention can be used in various occasions and is convenient to store.

11 Claims, 8 Drawing Sheets

(56) References Cited

U.S. PATENT DOCUMENTS

| | | | | |
|---|---|---|---|---|
| 7,490,847 | B2 * | 2/2009 | Dahl | B60B 33/0073 280/654 |
| 7,806,426 | B2 * | 10/2010 | Van Landingham, Jr. | B62B 3/02 280/47.35 |
| 8,256,630 | B2 * | 9/2012 | Zhu | A47B 31/04 211/195 |
| 8,672,147 | B2 * | 3/2014 | Lam | A47F 7/18 211/85.3 |
| 2006/0043687 | A1 | 3/2006 | Downs | |
| 2007/0063489 | A1 * | 3/2007 | Dinsdale | B60R 21/261 280/728.2 |
| 2014/0338574 | A1 * | 11/2014 | Wen | A47B 31/04 108/177 |
| 2017/0105520 | A1 * | 4/2017 | Ritter | B62B 5/0433 |
| 2018/0274255 | A1 * | 9/2018 | El-Wakeel | E04B 1/34352 |
| 2020/0189637 | A1 * | 6/2020 | Karlsson | B62B 5/0495 |

FOREIGN PATENT DOCUMENTS

| | | | | |
|---|---|---|---|---|
| CN | 106394635 | A | 2/2017 | |
| CN | 107380228 | A | 11/2017 | |
| CN | 207173659 | U | 4/2018 | |
| WO | WO-2011017128 | A2 * | 2/2011 | B62B 1/002 |

* cited by examiner

MULTIFUNCTIONAL FOLDING TROLLEY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application *is a reissue application of 16/614,557, filed on Nov. 18, 2019, now U.S. Pat. No. 11,034,370B2, and* is the National Stage Application of PCT/CN2018/107793, filed on Sep. 27, 2018, which claims the priority benefit of China Patent Application No. 201710644469.2 filed on Jul. 31, 2017, and entitled "Multifunctional folding trolley" which is incorporated by reference in its entirety.

TECHNICAL FIELD

The present invention relates to the technical field of trolleys, and in particular to a multifunctional folding trolley.

BACKGROUND

A trolley is often used to carry tool items. At present, most of the trolleys on the market have single functions, limited use occasions, large occupancy space, and high cost of packaging and transportation. Thus comes the present invention.

SUMMARY

An object of the present invention is to provide a multifunctional folding trolley that can be folded into different states for different occasions.

In view of the above problems, the present invention provides a technical solution as follows:

A multifunctional folding trolley is provided, comprising four pillars, and a first tray, a second tray and a third tray arranged from top to bottom; the first tray is disposed at the upper end of the four pillars, the second tray is disposed at the middle of the four pillars, and the third tray is disposed at the lower end of the four pillars and provided at the bottom with roller feet; the four pillars, arranged in a cubic shape with side openings, comprise a first pillar group and a second pillar group arranged front and rear in the direction of motion; with one end of the first tray in the length direction detachably disposed on the second pillar group, the first tray is provided at the other end in the length direction with a folding point associated with the first pillar group, such that it can be folded to attach to the first pillar group;

with one end of the second tray in the length direction detachably disposed on the first pillar group, the second tray is provided at the other end in the length direction with a folding point associated with the second pillar group, such that it can be folded to attach to the second pillar group;

the first pillar group, having a folding point associated with the third tray, can be folded to attach to the third tray; and the second pillar group, having a folding point associated with the third tray, can be folded to attach to the first tray.

In some embodiments, the first pillar group is connected at the upper portion by a connecting rod; a positioning rod is respectively disposed at both ends of the first tray in the width direction; and a positioning groove matching the positioning rod is disposed at the upper end of the second pillar group.

In some embodiments, the first pillar group is provided at the upper portion with a fixing seat, on which the first tray is rotatably disposed.

In some embodiments, the fixing seat comprises a fixing portion fixed on a sidewall of the first pillar group, and a rotating portion extending to a side of the first pillar group facing away from the second pillar group, with the first tray rotatably disposed on the rotating portion.

In some embodiments, a positioning hole is disposed on a side of the first pillar group facing the second pillar group; and a positioning pin matching the positioning hole is disposed on the second tray.

In some embodiments, the positioning hole comprises a first positioning hole and a second positioning hole in communication with each other up and down to form a gourd hole; the positioning pin comprises a second pin fixed on the second tray and a first pin arranged at the end of the second pin, the outer diameter of the first pin being larger than that of the second pin; the first pin matches the first positioning hole, and the second pin matches the second positioning hole.

In some embodiments, a chute, disposed between a middle portion of the second pillar group and the third tray, extends along the length direction of the second pillar group and is bent at the upper end to form a positioning groove; a positioning bar, disposed on the outer wall of the second tray, matches the positioning groove and the chute, and extends from the outer wall of the second tray to the second pillar group.

In some embodiments, the third tray is provided with a hinged seat, on which the lower end of the first pillar group is hinged.

In some embodiments, the third tray is respectively provided at both ends in the width direction with a limit seat, which comprises two limit plates arranged in parallel; the lower portion of the second pillar group is rotatably disposed on the front portion of the two limit plates by the rotating shaft, and the limit plates are provided in the rear with a through slot provided at an angle to the horizontal direction; a limit rod, disposed in the through slot, is connected with the rotating shaft through an elastic member, with the two limit rods connected by a connecting portion; when the elastic member is in a compressed state, the limit rod is located at an upper end of the through slot to vertically limit the second pillar group, and is pulled to move to the lower end of the through slot by the connecting portion, with the second pillar group rotatably folded along the limit seat.

In some embodiments, the second pillar group is provided at the upper portion with a pusher.

*In some embodiments, the second pillar group is provided at the upper portion with a pusher.*

Another multifunctional folding trolley is further provided. which includes a first tray, a second tray, a third tray and a plurality of pillars. The plurality of pillars include a first pillar group and a second pillar group. The first pillar group includes at least two first pillars. The second pillar group includes at least two second pillars. The third tray is disposed at lower ends of the plurality of pillars. Both the first pillar group and the second pillar group are connected to and rotatably relative to the third tray. The multifunctional folding trolley has a first using state and a compressed state. When the multifunctional folding trolley is in the first using state, an inclined angle is defined between the second pillar group and the third tray, and between the first pillar group and the third tray, respectively, and the second tray is located at the middle of the plurality of pillars; the first tray is capable of rotating to a position adiacent to the first pillar group and the second tray is capable of rotating to a position adiacent to the second pillar group, so as to define a space in a middle of the plurality of pillars, the first tray is further capable of rotating along with the first pillar group, and the second tray is further capable of rotating along with the second pillar group; and the first pillar group is capable of rotating to a position adiacent to the third tray through the space, and the second pillar group is capable of rotating to a position adiacent to the first pillar group, so that the multifunctional folding trolley is switched to the compressed state.

In some embodiments, the multifunctional folding trolley further includes two positioning bars, wherein the two positioning bars protrude from two sides of the first end of the second tray, respectively, and the two sides of the first end of the second tray are away from each other, the second tray is rotatably connected to the second pillar group via the two positioning bars, the second tray comprises a first end and a second end away from each other, the first end of the second tray is capable of rotating to a bottom end of the second pillar group along with rotating of the two positioning bars, and the second end of the second tray is capable of rotating to a top end of the second pillar group.

In some embodiments, the second pillar group includes two second pillars. Each sidewall of the two second pillars is provided with a first sliding channel, respectively. The first sliding channel extends along an axis of each of the two second pillars, and the two positioning bars extend into the first sliding channel and are capable of sliding along the first sliding channel.

In some embodiments, the first sliding channel includes a positioning groove, a transitional section and a chute, which are successively connected with each other, both the positioning groove and the transitional section are located at a top of the chute, the chute is located on a side of the second pillar group adiacent to the bottom of the second pillar group, and a length of the chute is greater than a length of the positioning groove; when the second tray is located in the middle of the plurality of pillars, the two positioning bars are located in the positioning groove; the two positioning bars are capable of sliding to the chute via the transitional section, and allowing the first end of the second tray to slide to the bottom end of the second pillar group.

Compared with the prior art, the present invention has the following advantages:

By adopting the technical solution of the present invention, the trolley can be folded into different states for different occasions, with simple structure, wide application range and low use cost.

BRIEF DESCRIPTION OF DRAWINGS

In order to illustrate the technical solutions of the examples of the present invention more clearly, the drawings to be used in the description of the examples will be briefly described below. The drawings in the following description are only some examples of the present invention, and those skilled in the art can obtain other drawings based on them without making any creative effort.

LIST OF REFERENCE NUMBERS

1. First pillar group; 1-1. positioning hole; 1-1a. first positioning hole; 1-1b. second positioning hole;
2. second pillar group; 2-1. positioning groove; 2-2. chute; 2-3. positioning groove;
3. first tray; 3-1. positioning rod;
4. second tray; 4-1. positioning pin; 4-1a. first pin; 4-1b. second pin; 4-2. positioning portion; 4-3. positioning bar;
5. third tray;
6. fixing seat; 6-1. fixing portion; 6-2. rotating portion;
7. hinged seat;
8. limit seat; 8-1. through slot;
9. rotating shaft;
10. elastic member;
11. limit rod;
12. push rod;
13. connecting rod;
14. roller foot;
15. pusher;
16. connecting rod.

DETAILED DESCRIPTION OF PREFERRED EMBODIMENTS

The above solution will be further described below with reference to specific examples. It is to be understood that these examples are intended to illustrate the present invention without limiting the scope thereof. The implementation conditions employed in the examples can be further adjusted according to the conditions of the specific manufacturer, with the unspecified implementation conditions being usually those in the conventional experiment.

Figure 1:
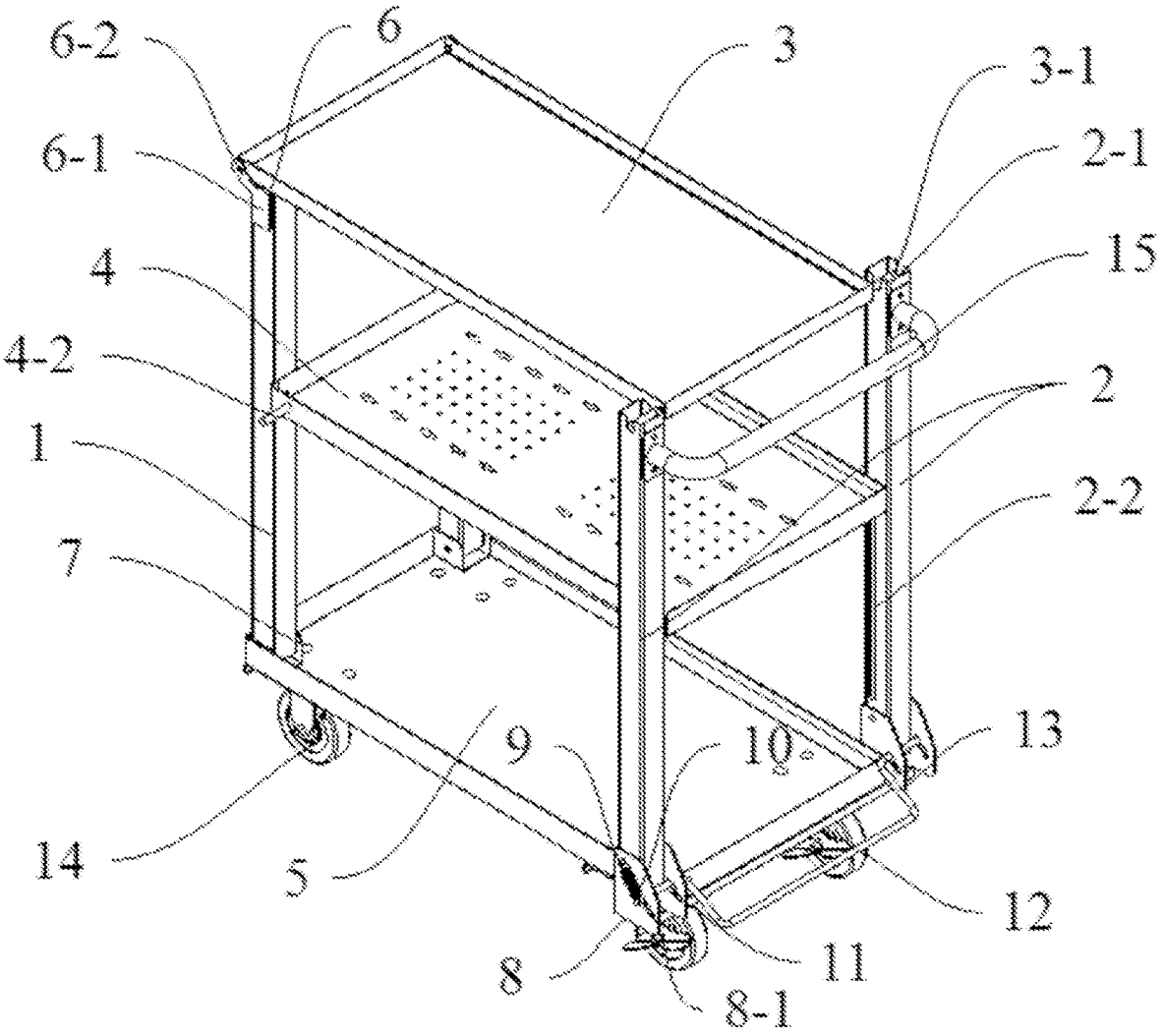
FIG. 1 is a schematic structural view of a multifunctional folding trolley in a three-deck state according to an example of the present invention.
Figure 2:
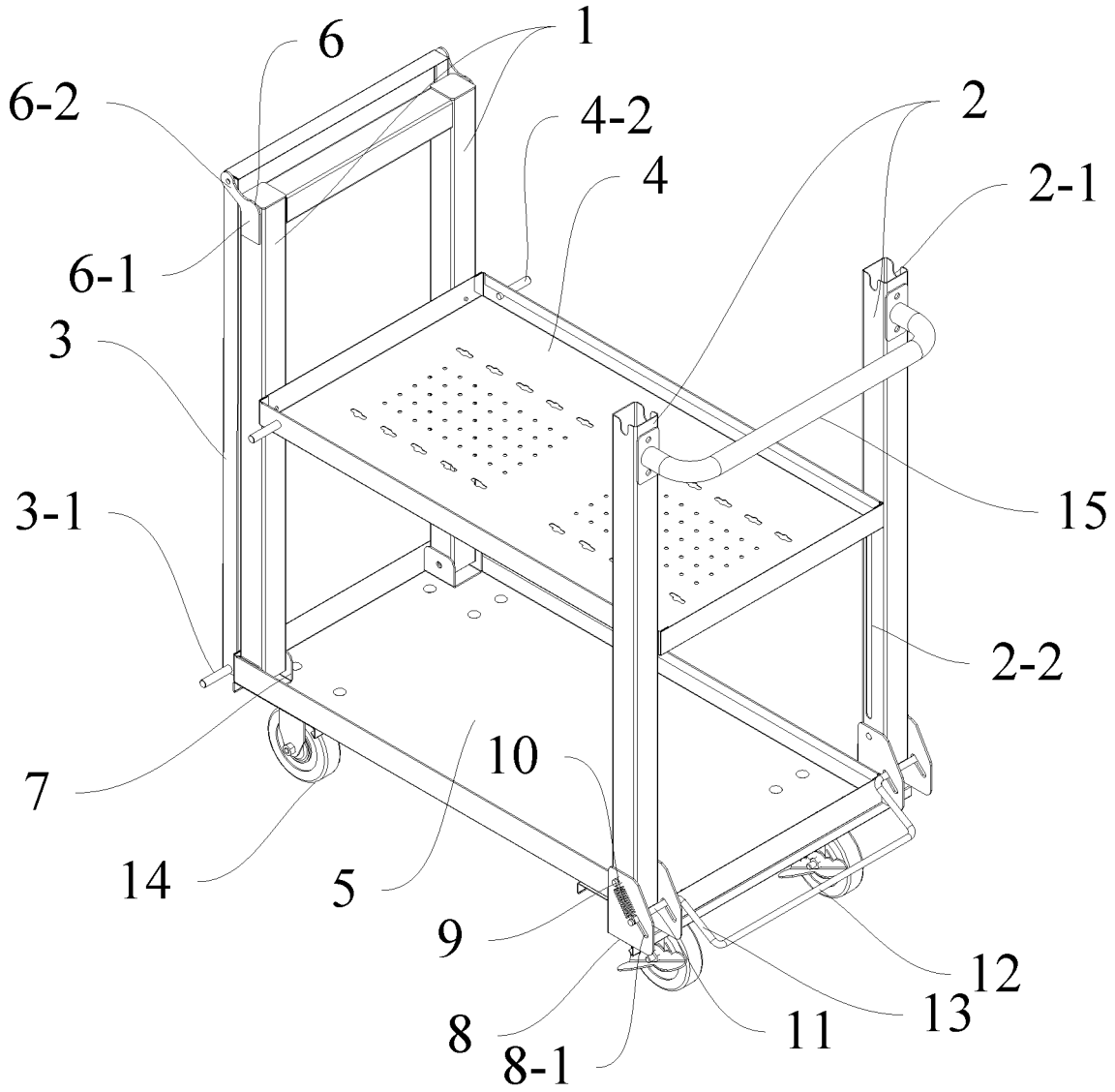
FIG. 2 is a schematic structural view of being folded into a two-deck state according to an example of the present invention.
Figure 3:
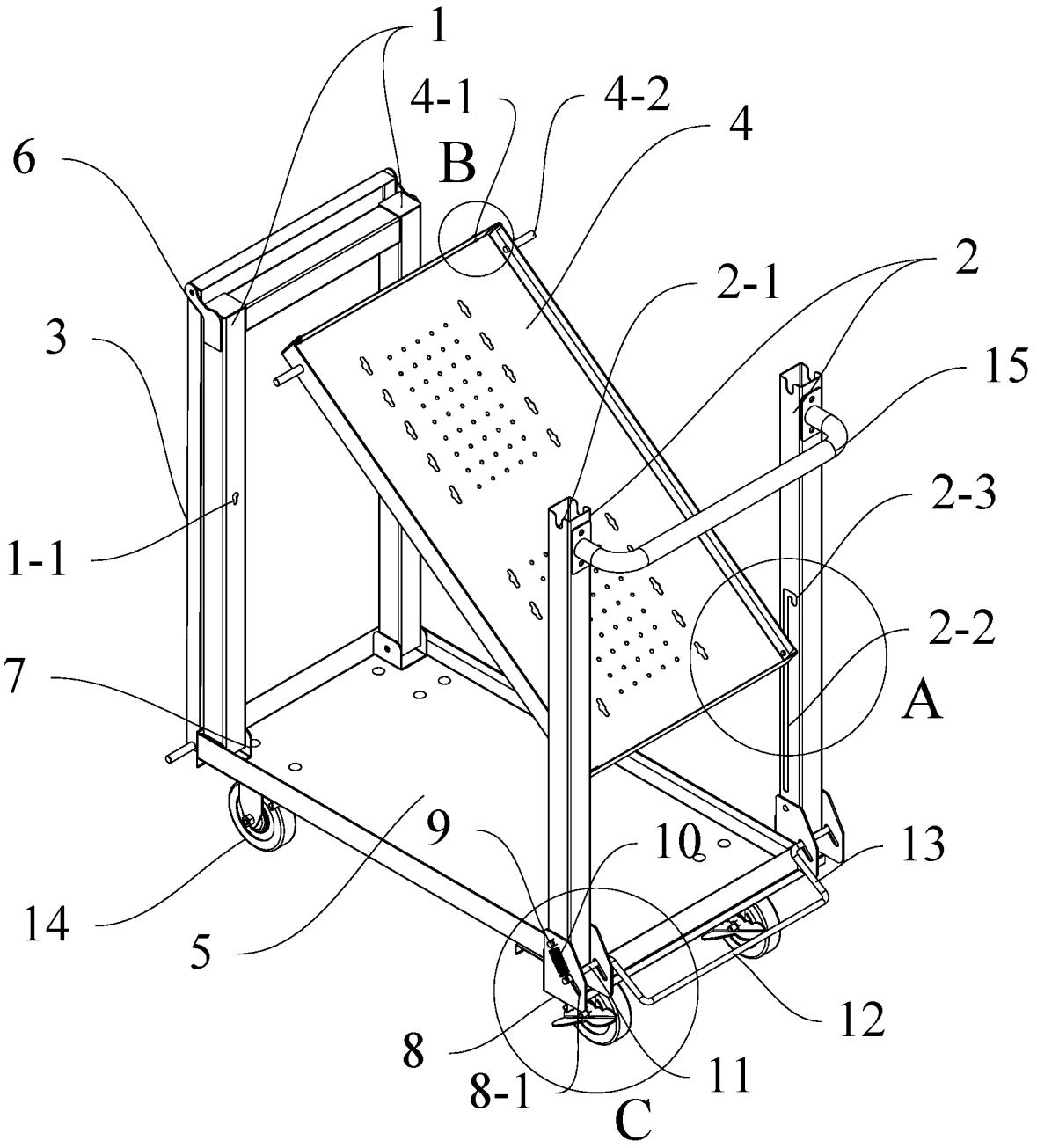
FIG. 3 shows a second tray folding process according to an example of the present invention.
Figure 4:
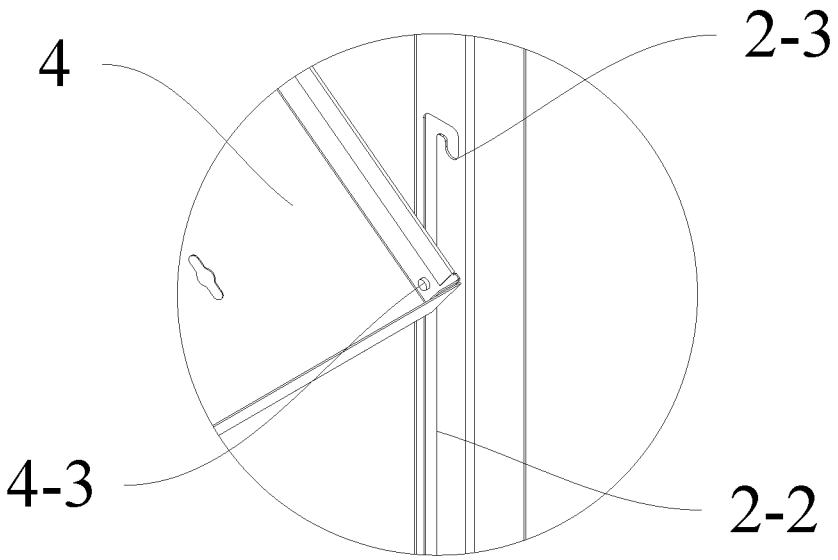
FIG. 4 is a partial enlarged view of a position A in FIG. 3.
Figure 5:
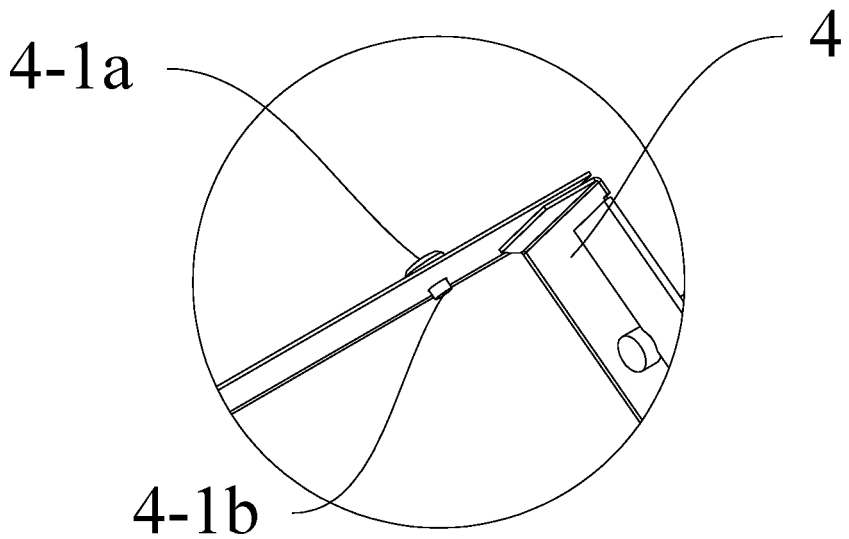
FIG. 5 is a partial enlarged view of a position B in FIG. 3.
Figure 6:
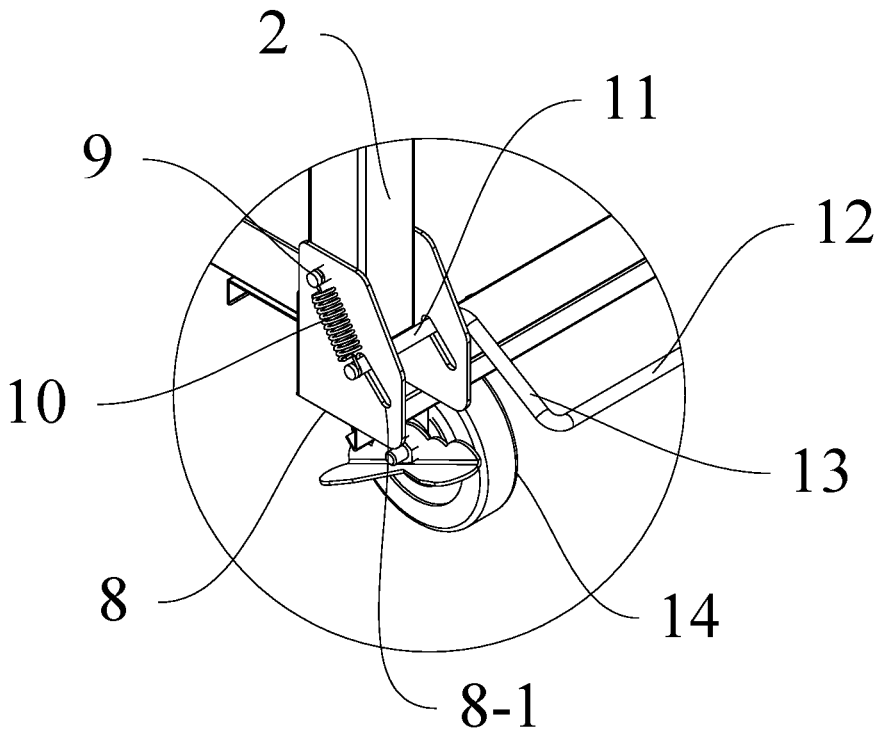
FIG. 6 is a partial enlarged view of a position C in FIG. 3.
Figure 7:
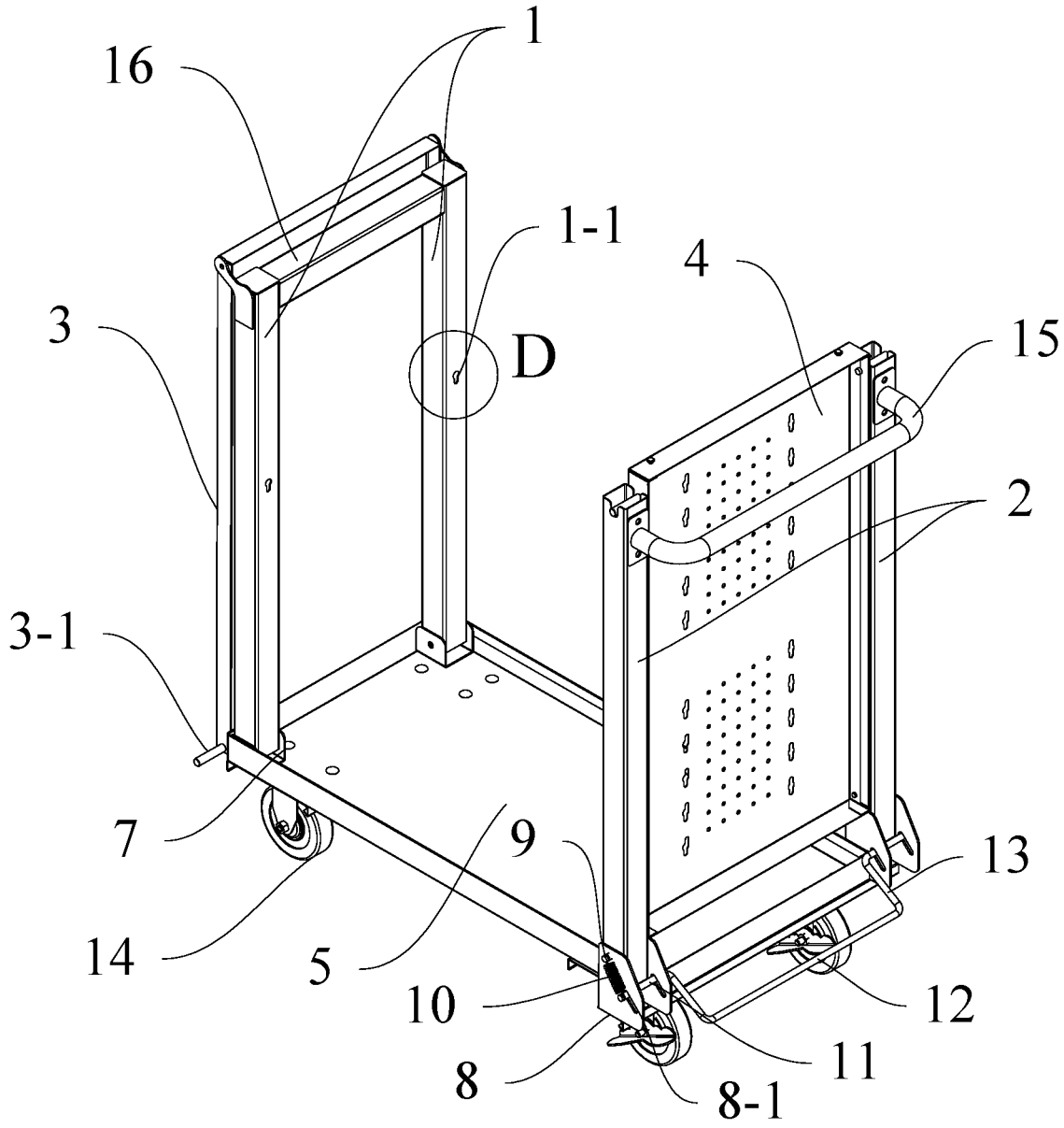
FIG. 7 is a schematic structural view after the second tray is folded according to an example of the present invention.
Figure 8:
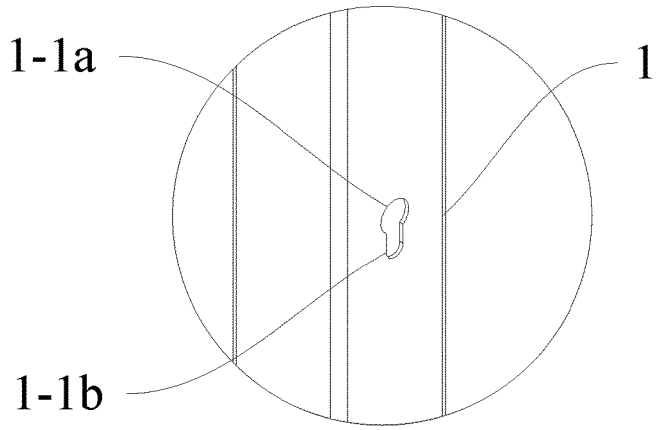
FIG. 8 is a partial enlarged view of a position D in FIG. 7.
Figure 9:
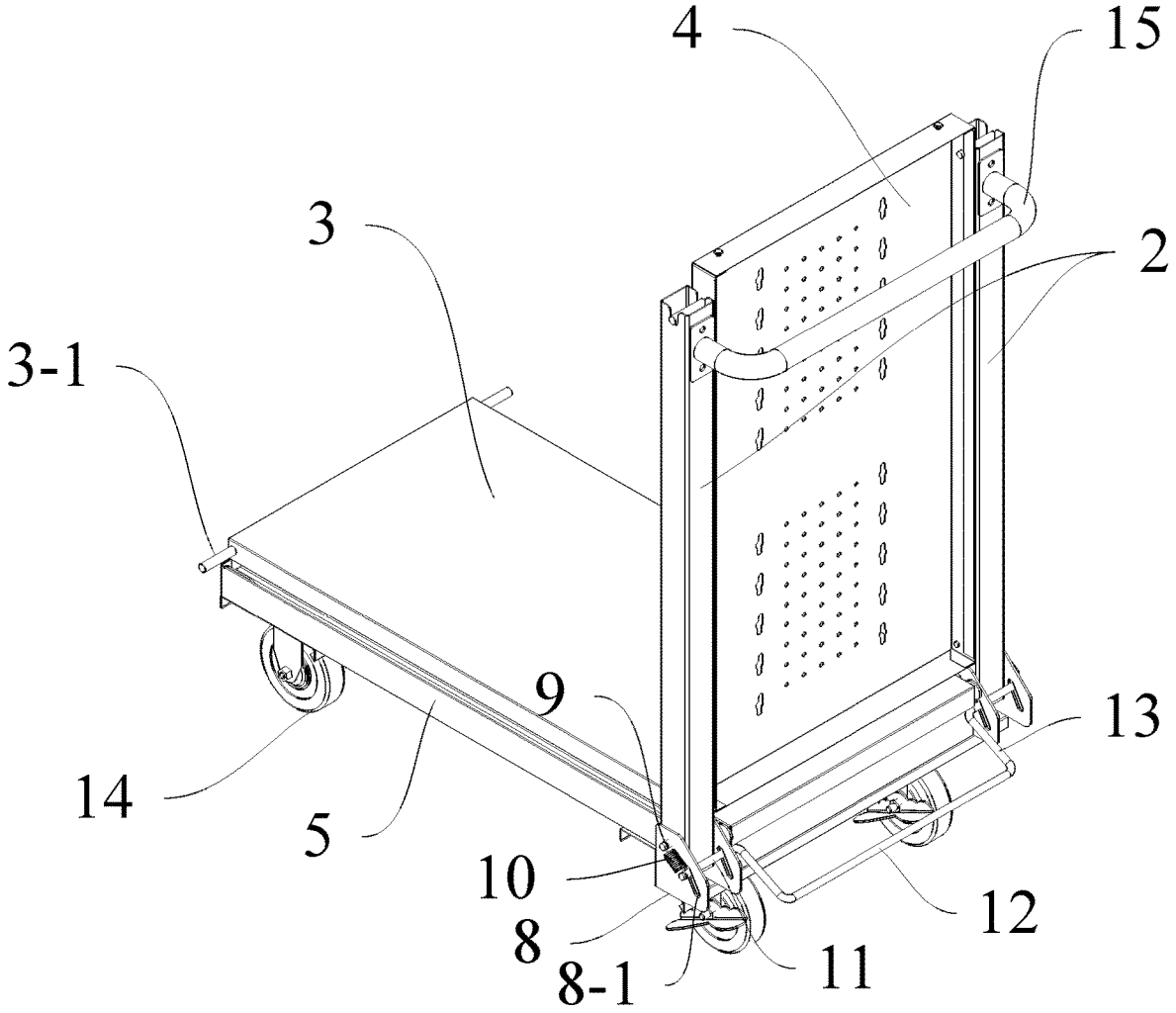
FIG. 9 is a schematic structural view of being folded into a single-deck trolley according to an example of the present invention.
Figure 10:
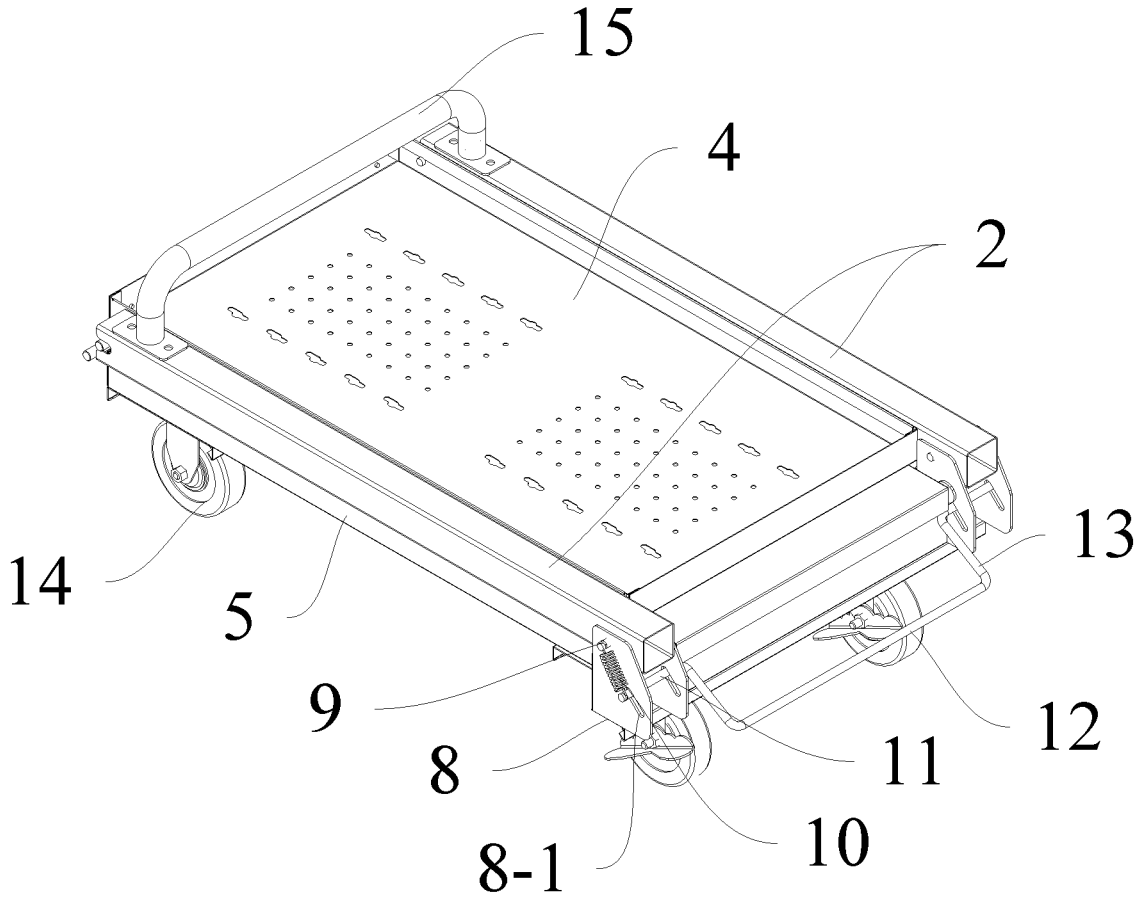
FIG. 10 is a schematic structural view after the trolley is completely folded according to an example of the present invention.

In accordance with an example of the present invention, as shown in FIGS. 1-10, a multifunctional folding trolley is provided, comprising four pillars, and a first tray 3, a second tray 4 and a third tray 5 arranged from top to bottom; the first tray 3 is disposed at the upper end of the four pillars, the second tray 4 is disposed at the middle of the four pillars, and the third tray 5 is disposed at the lower end of the four pillars and provided at the bottom with roller feet 14; the four pillars, arranged in a cubic shape with side openings, comprise a first pillar group 1 and a second pillar group 2 arranged front and rear in the direction of motion of the trolley.

With one end of the first tray 3 in the length direction detachably disposed on the second pillar group 2, the first tray 3 is provided at the other end in the length direction with a folding point associated with the first pillar group 1, such that it can be folded to attach to the first pillar group to fold the three-deck trolley into a two-deck trolley.

Specifically, a positioning rod 3-1 is respectively disposed at both ends of the first tray 3 in the width direction, and a positioning groove 2-1 matching the positioning rod 3-1 is disposed at the upper end of the second pillar group 2; in use, the positioning rod 3-1 is placed in the positioning groove 2-1 to fix the first tray 3 on the second pillar group 2; in order to improve the stability of the trolley, the first pillar group 1 is connected by a connecting rod 16, which is disposed at the upper portion of the first pillar group 1. Preferably, the upper end of the connecting rod 16 is on the same plane as the upper end face of the first pillar group 1; the first pillar group 1 is provided at the upper portion with a fixing seat 6, on which the first tray 3 is rotatably disposed; the fixing seat 6 comprises a fixing portion 6-1 fixed on a sidewall of the first pillar group 1, and a rotating portion 6-2 extending to a side of the first pillar group 1 facing away from the second pillar group 2, with the first tray 3 rotatably disposed on the rotating portion 6-2; the first tray 3 can be rotated and folded along the first pillar group 1 and then attached to the front side of the first pillar group 1.

With one end of the second tray 4 in the length direction detachably disposed on the first pillar group 1, the second tray 4 is provided at the other end in the length direction with a folding point associated with the second pillar group 2, such that it can be folded to attach to the second pillar group 2.

In this example, a positioning hole 1-1 is disposed on a side of the first pillar group 1 facing the second pillar group 2, and a positioning pin 4-1 matching the positioning hole 1-1 is disposed on the second tray 4; the positioning hole 1-1 comprises a first positioning hole 1-1a and a second positioning hole 1-1b in communication with each other up and down to form a gourd hole; the positioning pin 4-1 comprises a second pin 4-1b fixed on the second tray 4 and a first pin 4-1a arranged at the end of the second pin 4-1b, the outer diameter of the first pin 4-1a being larger than that of the second pin 4-1b; the first pin 4-1a matches the first positioning hole 1-1a, and the second pin 4-1b matches the second positioning hole 1-1b; a chute 2-2, disposed between a middle portion of the second pillar group 2 and the third tray 5, extends along the length direction of the second pillar group 2 and is bent at the upper end to form a positioning groove 2-3; a positioning bar 4-3, disposed on the outer wall of the second tray 4, matches the positioning groove 2-3 and the chute 2-2, and extends from the outer wall of the second tray 4 toward the second pillar group 2. In use, one end of the second tray 4 is turned up and detached from the first pillar group 1, and the positioning bar 4-3 at the other end of the second tray 4 is moved from the positioning groove 2-3 to the chute 2-2, so that the second tray 4 is moved downward along the second pillar group 2 and attached thereto, thus making the second tray 4 folded.

In order to improve the stability of the second tray 4 after folding, a positioning portion 4-2 matching the positioning groove 2-1 is respectively arranged at both ends of the second tray 4 in the width direction; the second tray 4 is folded and then attached to the second pillar group 2, and the positioning portion 4-2 at the upper end thereof can be placed in the positioning groove 2-1 at the upper end of the second pillar group 2.

The first pillar group 1, having a folding point associated with the third tray 5, can be folded to attach to the third tray 5. Specifically, the third tray 5 is provided with a hinged seat 7, on which the lower end of the first pillar group 1 is hinged, so that the first pillar group 1 can be folded along the hinged seat 7 and then attached to the third tray 5 to make the first pillar group 1 folded into a single-deck flat trolley.

The second pillar group 2, having a folding point associated with the third tray 5, can be folded to attach to the first tray 3. In this example, the third tray 5 is respectively provided at both ends in the width direction with a limit seat 8, which comprises two limit plates arranged in parallel; the lower portion of the second pillar group 2 is rotatably disposed on the front portion of the two limit plates by the rotating shaft 9, and the limit plates are provided in the rear with a through slot 8-1 provided at an angle to the horizontal direction; a limit rod 11, disposed in the through slot 8-1, is connected with the rotating shaft 9 through an elastic member 10; preferably, the elastic member 10 is a tension spring; a connecting portion is used to connect the two limit rods 11, so as to adjust the position of the limit rods 11; the connecting portion comprises a push rod 12 disposed behind the third tray 5, and a connecting rod 13 connecting the push rod 12 and the limit rod 11; with the push rod 12 in parallel with the limit rod 11, the connecting rod 13, the limit rod 11 and the push rod 12 are perpendicular to each other and connected in a zigzag shape; the connecting rod 13 limits the limit rod 11 between the two limit seats 8, so as to prevent the limit rod 11 from coming off the through slot 8-1. When the elastic member 10 is in a compressed state, the limit rod 11 is located at the upper end of the through slot 8-1 to vertically limit the second pillar group 2; the limit rod 11 is pulled by the connecting portion to move to the lower end of the through slot 8-1, and the second pillar group 2 is rotatably folded along the limit seat 8, such that the second pillar group 2 is folded. The folded trolley, occupying a small space, is easy to store or move.

In order to further optimize the implementation effect of the present invention and facilitate pushing the trolley, a pusher 15 is provided on the second pillar group 2.

The example described above, instead of limiting the protection scope of the present invention, is only intended to illustrate the technical concept and features of the present invention and enable those skilled in the art to understand and implement the present invention. Any equivalent alteration or modification made according to the spiritual substance of the present invention is intended to fall within the scope of the present invention.

What is claimed is:

1. A multifunctional folding trolley, comprising four pillars, and a first tray, a second tray and a third tray arranged from top to bottom; the first tray is disposed at [the upper end] *upper ends* of the four pillars, the second tray is disposed at [the] *a* middle of the four pillars, and the third tray is disposed at [the lower end] *lower ends* of the four pillars [and provided at the bottom with roller feet] *, roller feet are provided at a bottom of the third tray*; the four pillars, arranged in a cubic shape with side openings, comprise a first pillar group and a second pillar group arranged front and rear in [the] *a* direction of motion;

wherein:

with one end of the first tray in [the] *a* length direction detachably disposed on the second pillar group, the first tray is provided at the other end in [the] *a* length direction with a folding point associated with the first pillar group, such that it can be folded [to attach to] *towards* the first pillar group;

with one end of the second tray in the length direction detachably disposed on the first pillar group, the second tray is provided at the other end in the length direction with a folding point associated with the second pillar group, such that it can be folded [to attach to] *towards* the second pillar group;

the first pillar group, having a folding point associated with the third tray, can be folded [to attach to] *towards* the third tray; and the second pillar group, having a folding point associated with the third tray, can be folded [to attach to] *towards* the first tray.

2. The multifunctional folding trolley according to claim 1, wherein: a positioning rod is respectively disposed at both ends of the first tray in [the] *a* width direction; and a positioning groove matching the positioning rod is disposed at the upper end of the second pillar group.

3. The multifunctional folding trolley according to claim 1, characterized in that: the first pillar group is connected at [the] *an* upper portion *of the first pillar group* by a connecting rod; the first pillar group is provided at the upper portion *of the first pillar group* with a fixing seat, on which the first tray is rotatably disposed.

4. The multifunctional folding trolley according to claim 3, wherein: the fixing seat comprises a fixing portion fixed on a sidewall of the first pillar group, and a rotating portion extending to a side of the first pillar group facing away from the second pillar group, with the first tray rotatably disposed on the rotating portion.

5. The multifunctional folding trolley according to claim 1, wherein: a positioning hole is disposed on a side of the first pillar group facing the second pillar group; and a positioning pin matching the positioning hole is disposed on the second tray.

6. The multifunctional folding trolley according to claim 5, wherein: the positioning hole comprises a first positioning hole and a second positioning hole in communication with each other up and down [to form a gourd hole]; the positioning pin comprises a second pin fixed on the second tray and a first pin arranged at the end of the second pin, the outer diameter of the first pin being larger than that of the second pin; the first pin [matches] *fits with* the first positioning hole, and the second pin [matches] *fits with* the second positioning hole.

7. The multifunctional folding trolley according to claim 1, wherein: a chute, disposed between a middle portion of the second pillar group and the third tray, extends along [the] *a* length direction of the second pillar group and is bent at [the] *an* upper end to form a positioning groove; a positioning bar, disposed on the outer wall of the second tray, [matches] *fits with* the positioning groove and the chute, and extends from [the] *an* outer wall of the second tray to the second pillar group.

8. The multifunctional folding trolley according to claim 1, wherein: the third tray is provided with a hinged seat, on which [the] *a* lower end of the first pillar group is hinged.

9. The multifunctional folding trolley according to claim 1, wherein: the third tray is respectively provided at both ends in [the] *a* width direction with a limit seat, which comprises two limit plates arranged in parallel; [the] *a* lower portion of the second pillar group is rotatably disposed on [the] *a* front portion of the two limit plates by [the] *a* rotating shaft, and the limit plates are provided in [the] *a* rear with a through slot provided at an angle to the horizontal direction; a limit rod, disposed in the through slot, is connected with the rotating shaft through an elastic member, with [the] two limit rods connected by a connecting portion; when the elastic member is in a compressed state, the limit rod is located at an upper end of the through slot to vertically limit the second pillar group, and *the limit rod* is pulled to move to [the] *a* lower end of the through slot by the connecting portion, with the second pillar group rotatably folded along the limit seat.

10. The multifunctional folding trolley according to claim 1, wherein: the second pillar group is provided at [the] *an* upper portion *of the second pillar group* with a pusher.

*11. A multifunctional folding trolley. comprising four pillars, and a first tray, a second tray and a third tray arranged from top to bottom; the first tray is disposed at upper ends of the four pillars, the second tray is disposed at a middle of the four pillars, and the third tray is disposed at lower ends of the four pillars; the four pillars, arranged in a cubic shape with side openings, comprise a first pillar group and a second pillar group arranged front and rear in a direction of motion; wherein: with one end of the first tray in a length direction detachably disposed on the second pillar group, the first tray is provided at the other end in a length direction with a folding point associated with the first pillar group, such that it can be folded towards the first pillar group; with one end of the second tray in the length direction detachably disposed on the first pillar group, the second tray is provided at the other end in the length direction with a folding point associated with the second pillar group, such that it can be folded towards the second pillar group; the first pillar group, having a folding point associated with the third tray, can be folded towards the third tray; and the second pillar group, having a folding point associated with the third tray, can be folded towards the first tray.*

* * * * *